(12) United States Patent
Zhu

(10) Patent No.: US 11,440,471 B2
(45) Date of Patent: Sep. 13, 2022

(54) AUTOMATED WARNING SYSTEM TO DETECT A FRONT VEHICLE SLIPS BACKWARDS

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 679 days.

(21) Appl. No.: 16/360,986

(22) Filed: Mar. 21, 2019

(65) Prior Publication Data

US 2020/0298754 A1    Sep. 24, 2020

(51) Int. Cl.

| | |
|---|---|
| *B60Q 5/00* | (2006.01) |
| *G08G 1/16* | (2006.01) |
| *B60Q 1/46* | (2006.01) |
| *B60Q 3/70* | (2017.01) |
| *B60T 7/22* | (2006.01) |
| *B60Q 9/00* | (2006.01) |

(52) U.S. Cl.
CPC .............. *B60Q 5/006* (2013.01); *B60Q 1/46* (2013.01); *B60Q 3/70* (2017.02); *B60Q 9/00* (2013.01); *B60T 7/22* (2013.01); *G08G 1/166* (2013.01); *B60T 2210/20* (2013.01); *B60T 2210/32* (2013.01)

(58) Field of Classification Search
CPC ........ B60T 17/22; B60T 7/22; B60T 2230/08; B60T 2210/20; B60T 2210/32; B60T 2201/02; B60Q 1/46; B60Q 1/525; B60Q 3/70; B60Q 5/006; B60Q 9/008; B60Q 9/00; B60W 30/09; B60W 50/14; G08G 1/166

USPC .......................................................... 701/27
See application file for complete search history.

(56) References Cited

U.S. PATENT DOCUMENTS

| | | | | | |
|---|---|---|---|---|---|
| 9,436,880 | B2 * | 9/2016 | Bos | .......................... | B60R 1/00 |
| 2016/0339959 | A1 * | 11/2016 | Lee | ....................... | B60W 30/09 |
| 2016/0349066 | A1 * | 12/2016 | Chung | ............... | G01C 21/3658 |
| 2017/0305418 | A1 * | 10/2017 | Bae | ........................ | G08G 1/166 |
| 2018/0284234 | A1 * | 10/2018 | Curatu | .................. | G05D 1/024 |
| 2018/0284284 | A1 * | 10/2018 | Curatu | .................... | G01S 17/89 |
| 2019/0049992 | A1 * | 2/2019 | Riess | ...................... | G08G 1/166 |

(Continued)

FOREIGN PATENT DOCUMENTS

| | | | | | |
|---|---|---|---|---|---|
| CA | 2905863 | C | * | 3/2019 | ............. B60R 1/00 |
| CN | 108528431 | A | * | 9/2018 | ................ B60T 7/12 |
| CN | 108536134 | A | * | 9/2018 | ........... G05D 1/0231 |

(Continued)

*Primary Examiner* — Atul Trivedi
(74) *Attorney, Agent, or Firm* — Womble Bond Dickinson (US) LLP

(57) ABSTRACT

In one embodiment, a system perceives an environment surrounding an ADV including a vehicle in front of the ADV. The system determines whether the vehicle in front is slipping backwards based on the perception. The system determines whether the vehicle in front is situated on a road with a slope based on map information. The system determines whether a tail light or a brake light of the vehicle in front is turned on based on the perception. If it is determined that the vehicle in front is situated on a sloped road, is slipping backwards, and the tail light or the brake light is not turned on, the system calculates a time to impact or a distance to impact based on the distance and speed of the vehicle in front.

20 Claims, 10 Drawing Sheets

(56) References Cited

U.S. PATENT DOCUMENTS

2019/0079514 A1* 3/2019 Zhu .................. G06V 20/56
2020/0074266 A1* 3/2020 Peake ................ G05D 1/0231

FOREIGN PATENT DOCUMENTS

| CN | 111724627 A | * | 9/2020 | ............... B60Q 1/46 |
| WO | WO-2018055449 A2 | * | 3/2018 | ........... B60Q 1/0023 |
| WO | WO-2020041188 A1 | * | 2/2020 | ......... B60K 31/0008 |
| WO | WO-2020041191 A1 | * | 2/2020 | ........... B60W 50/14 |
| WO | WO-2020205629 A1 | * | 10/2020 | ........... G05D 1/0088 |

* cited by examiner (Contour Map)

AUTOMATED WARNING SYSTEM TO DETECT A FRONT VEHICLE SLIPS BACKWARDS

TECHNICAL FIELD

Embodiments of the present disclosure relate generally to operating autonomous vehicles. More particularly, embodiments of the disclosure relate to an automated warning system to detect a front vehicle slips backwards.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

It is common a vehicle may slip backwards when it idles at a traffic light, or in a traffic jam, which can cause an accident. A warning system to warn passengers of a potential impact is useful for a driver-assist, or a fully autonomous, driving vehicle.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to one embodiment, a system or method is disclosed to automatically warn passengers when a vehicle in front slips backwards. The system perceives an environment surrounding an ADV including a vehicle in front of the ADV. The system determines whether the vehicle in front is slipping backwards based on the perception. The system determines whether a tail light or a brake light of the vehicle in front is turned on based on the perception. If it is determined that the vehicle is slipping backwards and the tail light or the brake light is not turned on, a warning signal is generated to warn at least a driver of the vehicle in front is slipping backwardly.

In one embodiment, the system further determines whether the vehicle in front is situated on a road with a slope based on map information. The warning signal may be generated in response to determining that the vehicle in front is on a sloped road. In one embodiment, if it is determined that the vehicle in front is slipping backwardly, the system calculates a time to impact or a distance to impact based on the distance and speed of the vehicle in front. The warning signal may be generated when the time to impact is below a predetermined threshold. A warning signal may be in a form of audio (e.g., horn) or visual signal (e.g., flashing a headlight) designed to warn the driver of the vehicle in front. In addition, a warning signal is also be utilized to warn a passenger or driver of the ADV using a mechanical or physical action, such as, for example, by vibrating a steering wheel.

Figure 1:
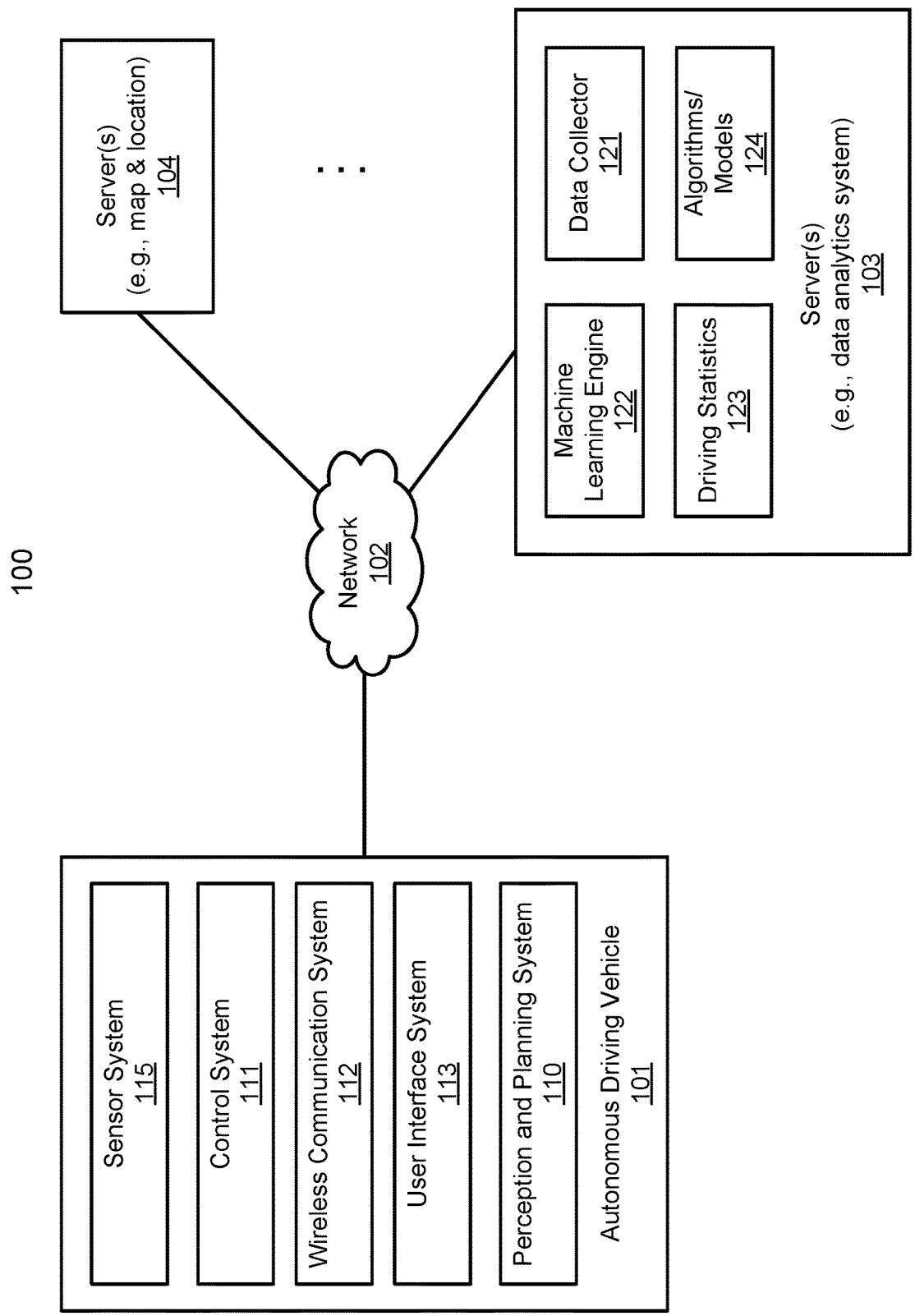
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
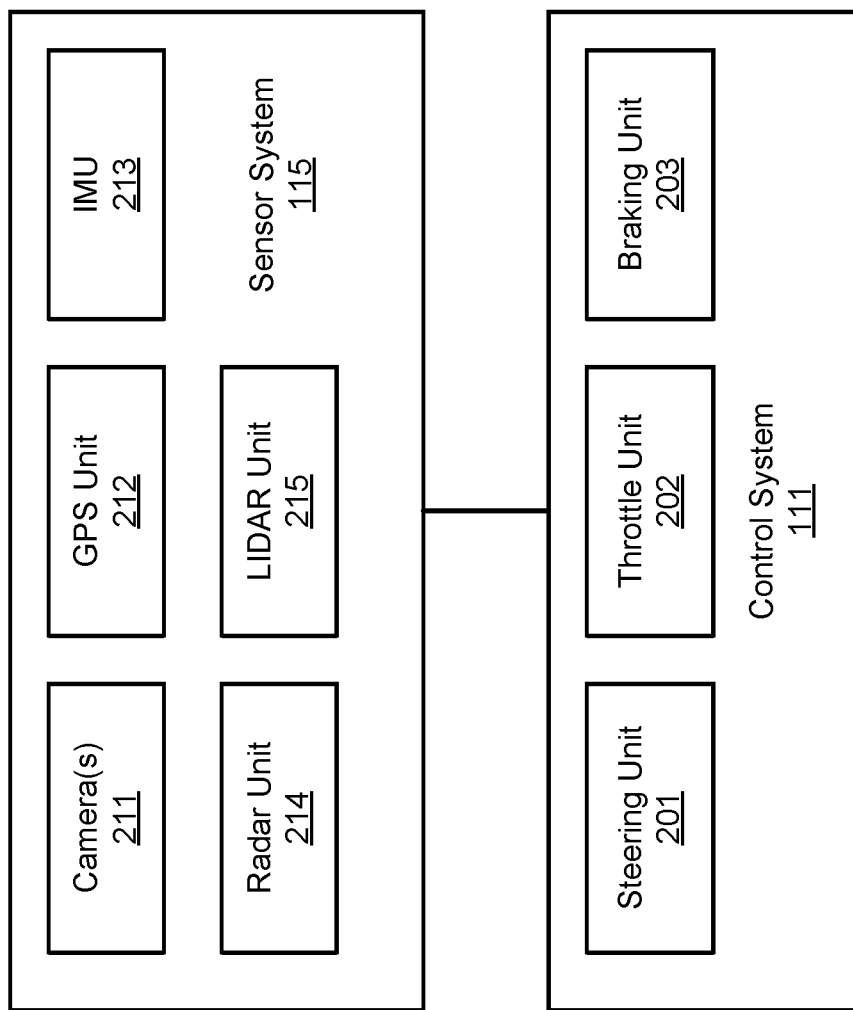
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include image recognition algorithms to determine an object to be a vehicle and classify the vehicle into a category (such as a car, a SUV, a truck, an RV). The image recognition algorithms can further determine whether a tail light or a brake light is turn on or off for a vehicle in front of the ADV. Algorithms 124 can then be uploaded on ADVs (such as algorithm/models 313 of FIG. 3A for ADV 101) to be utilized during autonomous driving in real-time.

Figure 3A:
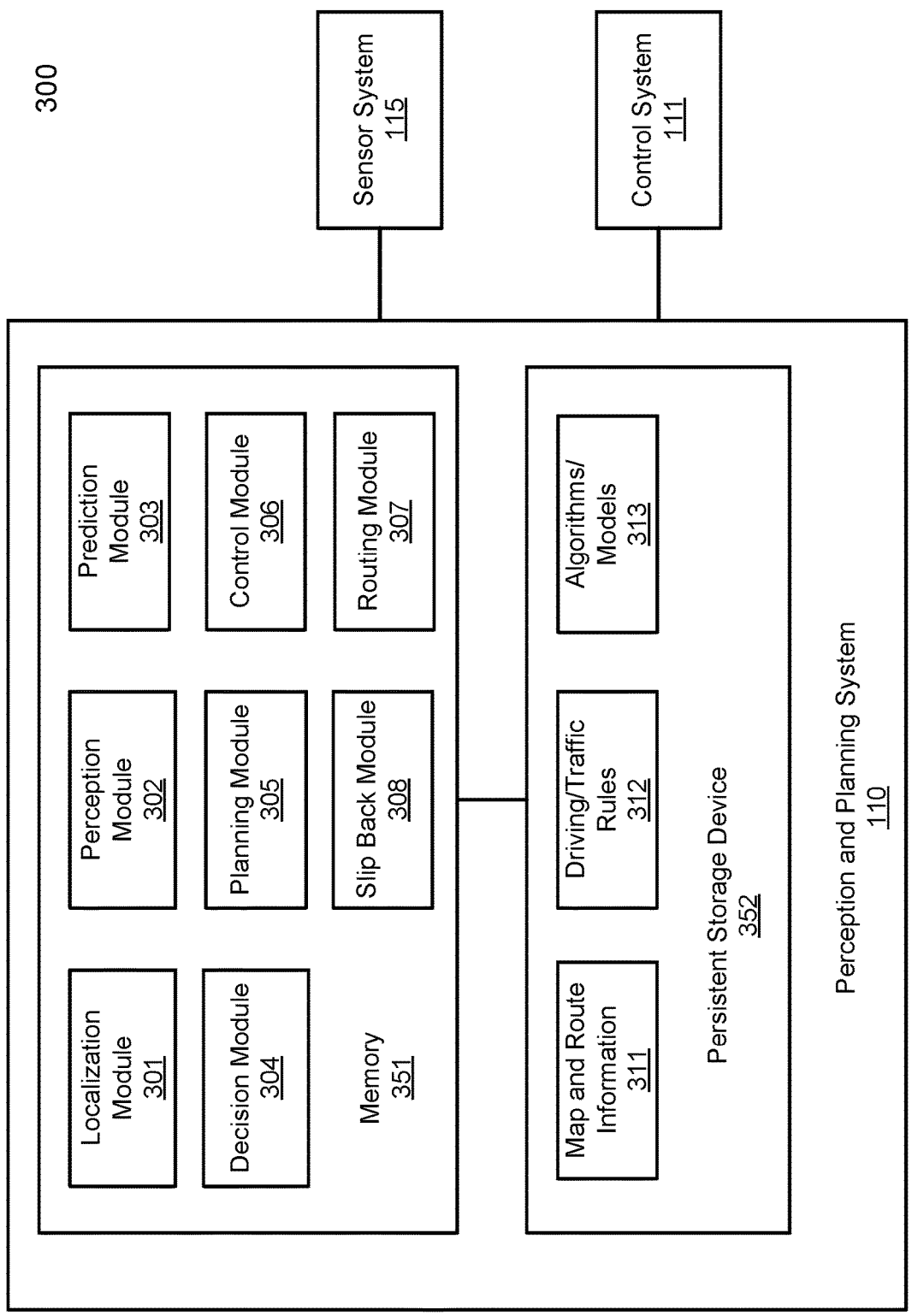
FIGS. 3A-3B are block diagrams illustrating an example of a perception and planning system used with an autonomous vehicle according to one embodiment.
Figure 3B:
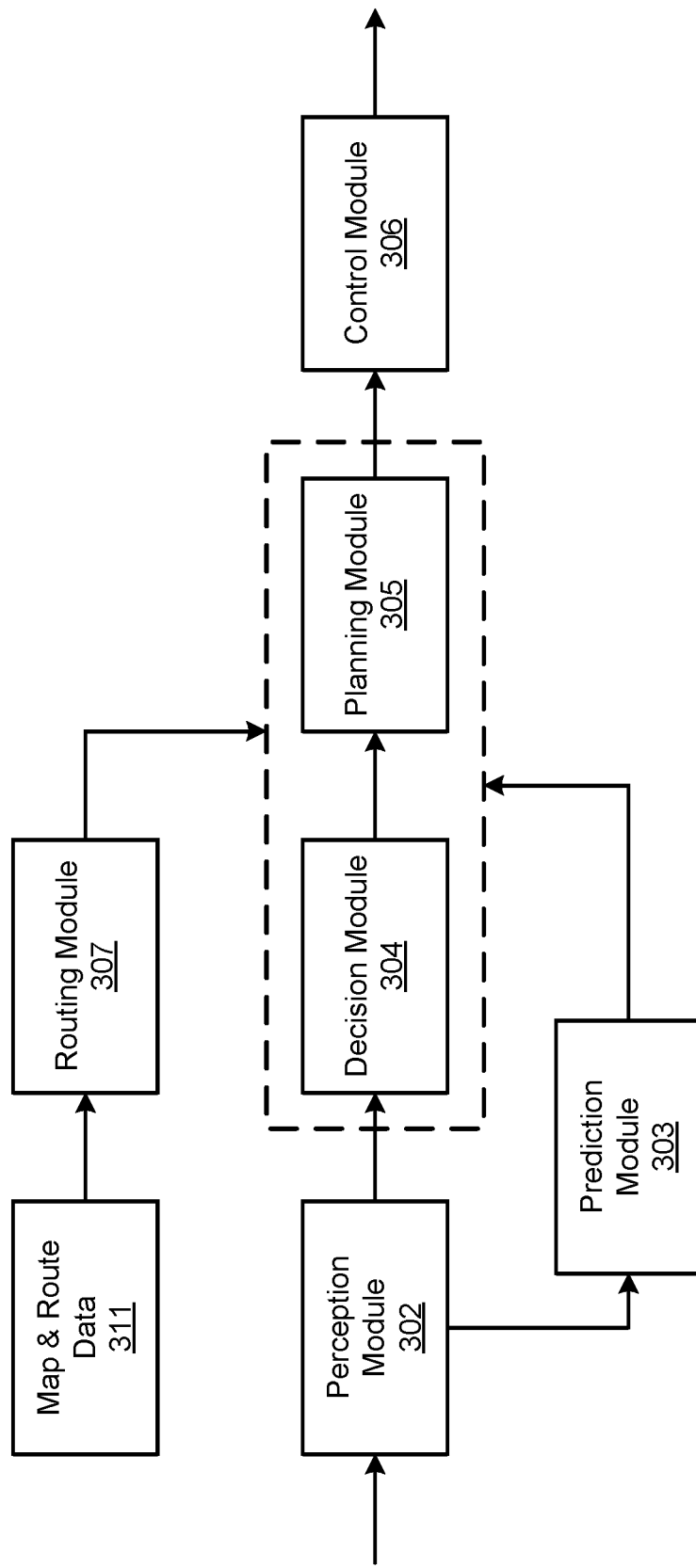

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and slip back module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module, for example slip back module 308, perception module 302 and/or planning module 305.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4:
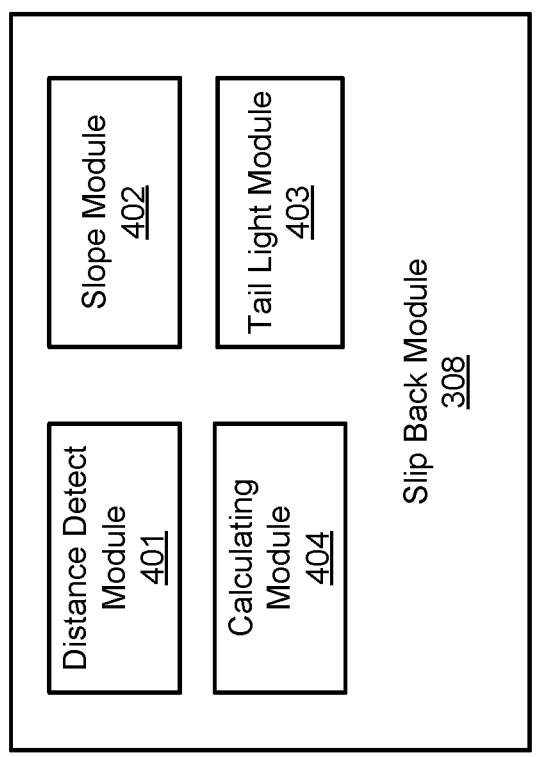
FIG. 4 is a block diagram illustrating an example of a slip back module according to one embodiment.

FIG. 4 is a block diagram illustrating an example of a slip back module according to one embodiment. Slip back module 308 (also referred to as a slip back detection module) can automatically warn passengers when a vehicle in front of an ADV is detected to slip backwards under certain circumstances. In one embodiment, slip back module 308 includes distance detect module 401, slope module 402, tail light module 403, and calculating module 404. Distance detect module 401 can detect a distance for a vehicle in front (or frontal vehicle) of an ADV to be decreasing (or slipping backwards) based on a perception of the ADV. Slope module 402 can detect a frontal vehicle is situated on a sloped roadway based on a map information, or based on the orientation information provided by an IMU. Tail light module 403 can detect the frontal vehicle has a tail light or a brake light turned on based on perception information. The perception information may be provided by an image recognition algorithm (as part of algorithm/models 313 of FIG. 3A) of the ADV 101 to distinguish on/off tail/brake lights. Calculating module 404 can calculate a time to impact or a distance to impact based on the distance and speed of the frontal vehicle.

Figure 5:
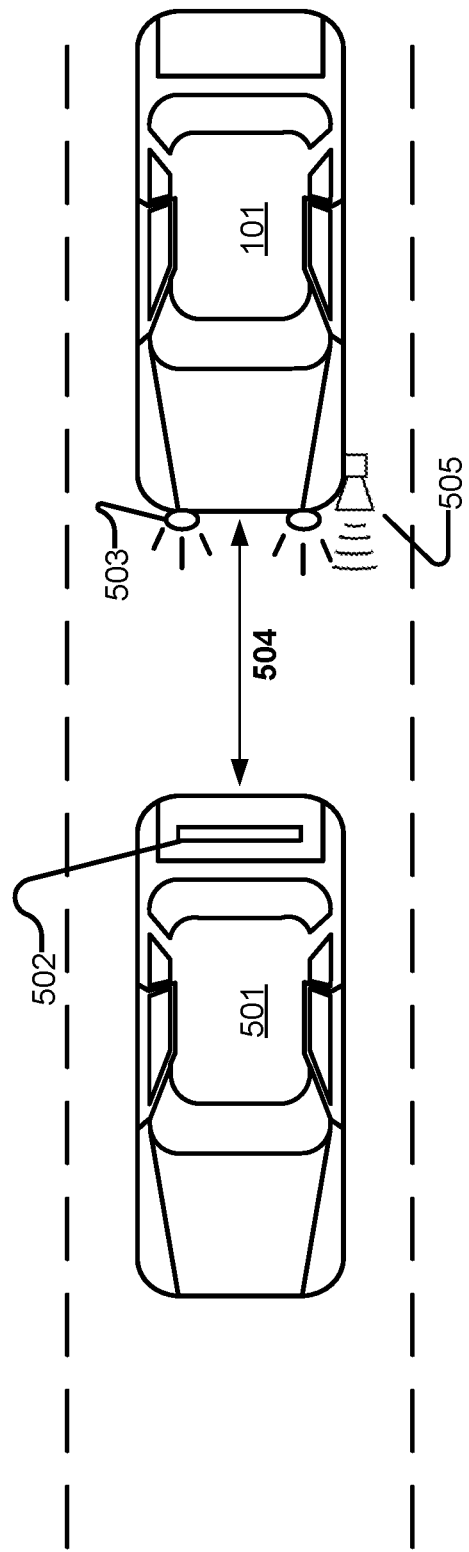
FIG. 5 is a block diagram illustrating two vehicles idle on a roadway according to one embodiment.

FIG. 5 is a block diagram illustrating two vehicles idle on a roadway according to one embodiment. Referring to FIG. 5, ADV 101 is situated in the same lane but behind vehicle 501, e.g., vehicle 501 is a vehicle in front of ADV 101. In some cases, vehicle 501 may not be aligned to ADV 101 but has a portion of a vehicle body in front of ADV 101.

In one embodiment, ADV 101 includes a perception system to perceive a surrounding of the ADV including vehicle 501. When ADV 101 is idle or not moving, distance detect module 401 of slip back module 308 can automatically determine a distance to collision with respect to vehicle 501. ADV 101 can determine distance 504 to vehicle 501 at predetermined time periods, e.g., every 500 ms. For example, ADV 101 may determine distance 504 to be 4 meters at time t1 and 3.5 meters to time t2=t1+500 ms. Based on the two distance measurements, because the distance is decreasing with time, distance detect module 401 can determine the vehicle in front is slipping backwards based on the perception. Note, the distance can be determined from a variety of sensors, or a combination thereof, such as RADAR, LIDAR, and/or camera sensors.

Figure 6:
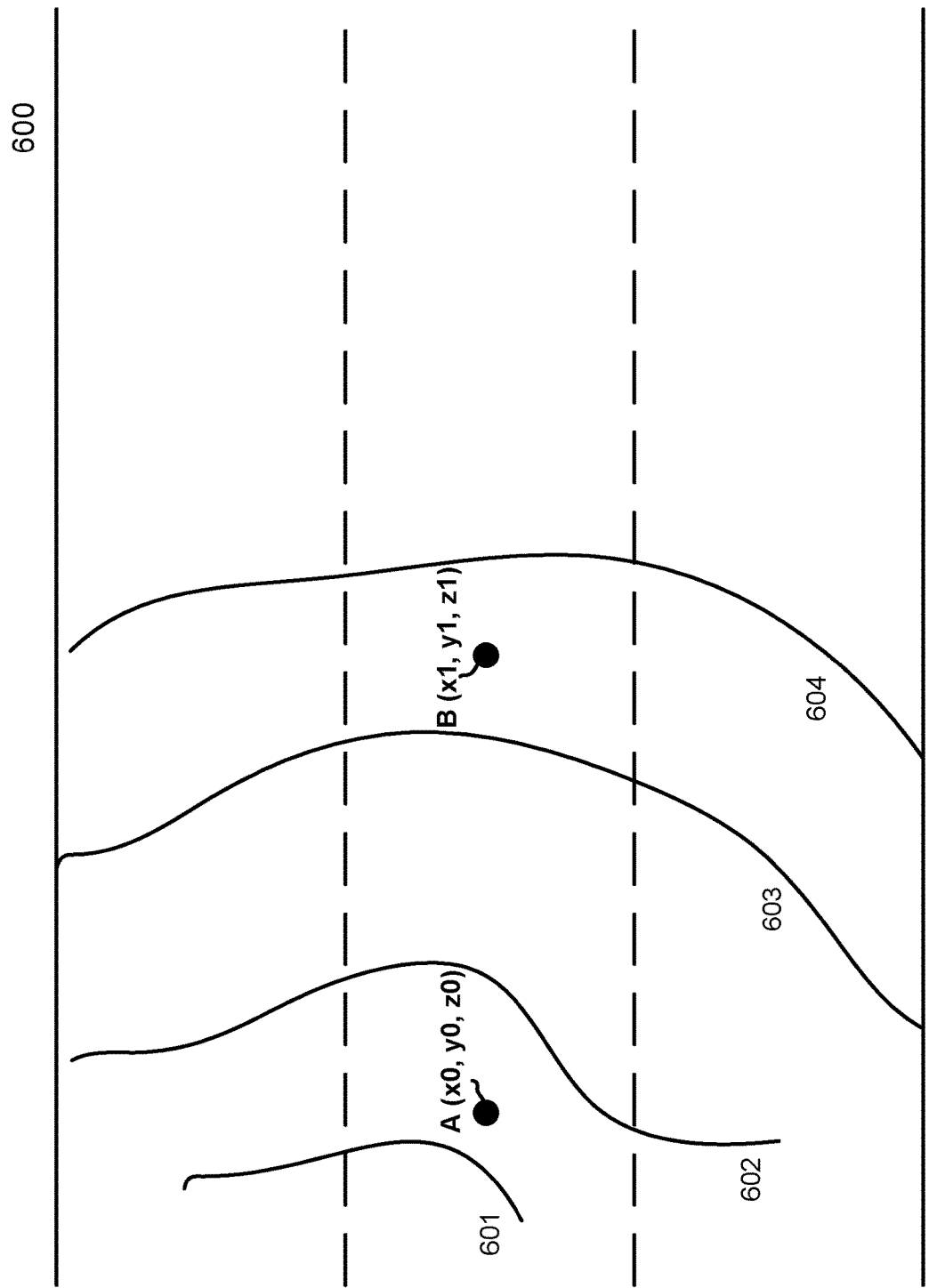
FIG. 6 is an example contour map according to one embodiment.

Next, ADV 101 determines whether the vehicle in front is situated on a roadway with a slope based on map information, such as contour map information (as part of map and route information 311 of FIG. 3A). FIG. 6 is an example contour map according to one embodiment. Contour map 600 can include a number of contour lines (601-604) that describe different altitudes for a terrain. Referring to FIG. 6, ADV 101 can identify or approximate two wheel points (points A and B) for vehicle 501 on contour map 600. In one embodiment, the two wheel points can be perceived by ADV 101. In another embodiment, the two wheel points can be approximated by the type of vehicle perceived. Based on the map information for points A and B, respective altitudes z0 and z1 can be determined. In one embodiment, ADV 101 determines vehicle 501 is situated on a slope if it is determined a difference of z0 and z1 is greater than a predetermined height threshold. In another embodiment, ADV 101 determines vehicle 501 is sloped to slip backwards by determining z0 is greater than z1, or is greater by the predetermined height threshold. In another embodiment, the height threshold can be dependent on the type of vehicles, e.g., a truck may have a larger height threshold than a sedan vehicle type.

Next, ADV 101 determines whether a tail light or a brake light of the vehicle in front is turned on based on a perception. Referring to FIG. 5, tail light or brake light 502 may be different for different types and/or models of vehicles. Here, the detection can be performed by an image recognition algorithm.

Once it is determined that a set of conditions is satisfied, e.g., vehicle 501 is situated on a sloped road, is slipping backwards, and/or tail light or brake light 502 of vehicle 501 is not turned on, ADV 101 calculates a time to impact based on a perceived distance to vehicle 501 and speed of vehicle 501. For example, the time to impact can be calculated assuming a relatively constant speed (e.g., time=distance/speed). The speed may be updated based on a newly observed speed for each computation cycle (e.g., 500 ms), where the calculations can be iteratively performed. Note that any one or more of the conditions described above can be utilized to trigger a warning system to generate a warning signal, to a driver of the vehicle in front, a driver of the ADV, or both.

If the time to impact if less than a predetermined threshold (e.g., 8 seconds), according to one embodiment, the ADV 101 may automatically trigger a warning system to go off. Triggering the warning system may include sending a variety of warning signals by ADV 101 to warn passengers of ADV 101 and/or passengers of the vehicle in front of ADV 101. For example, warning signals to warn passengers of the vehicle in front of ADV 101 can include continuously flashing of a headlamp 503, or sending a short horn sound signal, or a continuous horn sound signal through horn 505. In one embodiment, a continuous horn sound signal can increase in volume as the time to impact decreases.

Figure 7:
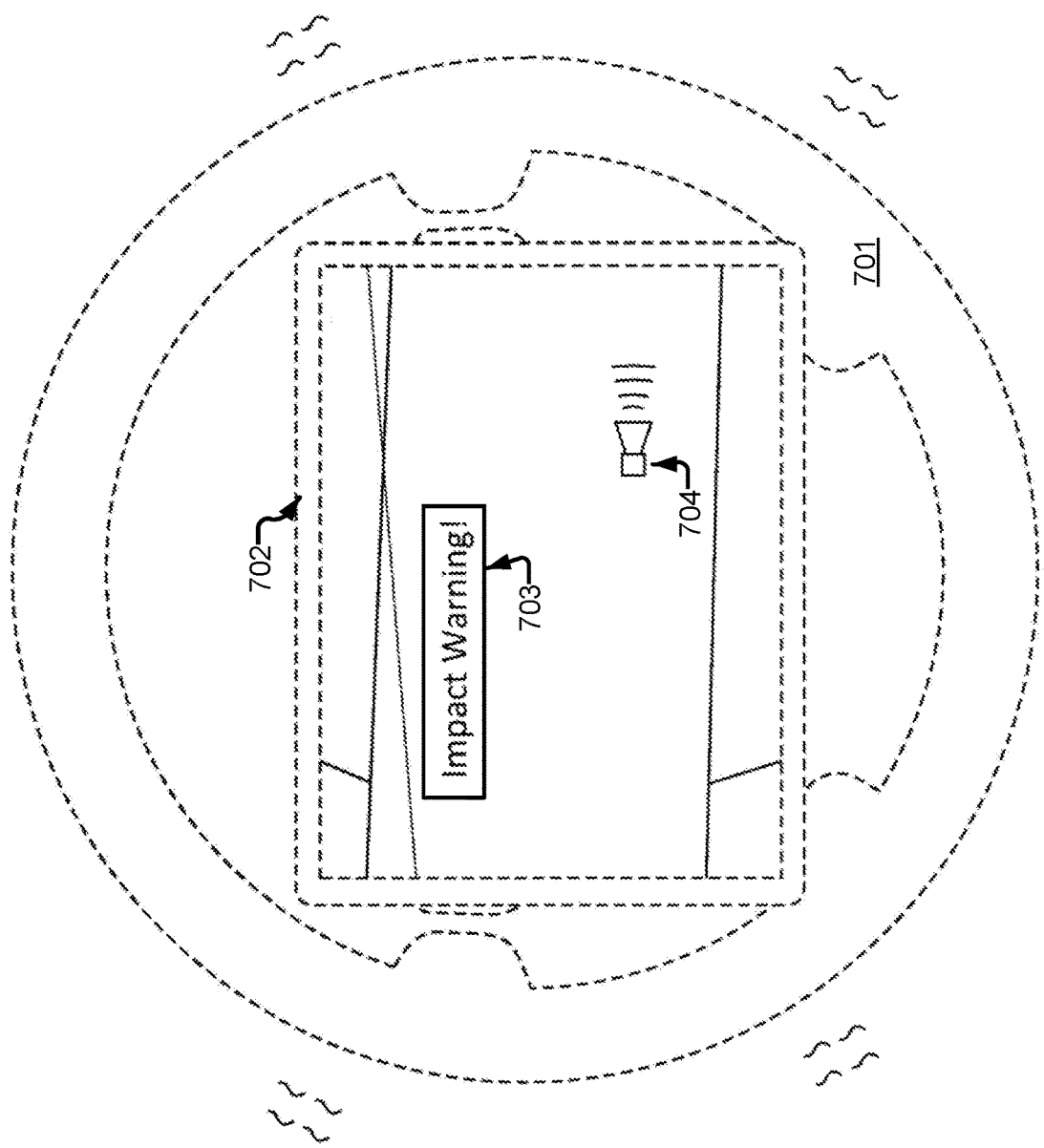
FIG. 7 illustrates an example front dash steering wheel according to one embodiment.

FIG. 7 illustrates an example front dash steering wheel according to one embodiment. Warning signals for passengers of ADV 101 can include displaying a warning signal 703 on a display 702 of ADV 101, or vibration of a steering wheel 701, or a warning sound 704 through a speaker of ADV 101. Although only some warning signals are discussed, the type of warning signals should not be construed to be limiting as long as the warning signals are detectable by a sensor of touch, sight, and/or hearing of the passengers. In addition to the warning system, ADV 101 may further detect an imminent impact is about to happen, determine whether it is safe to release a brake of the ADV, and releases the brake of the ADV prior to the impact to cushion the impact.

Figure 8:
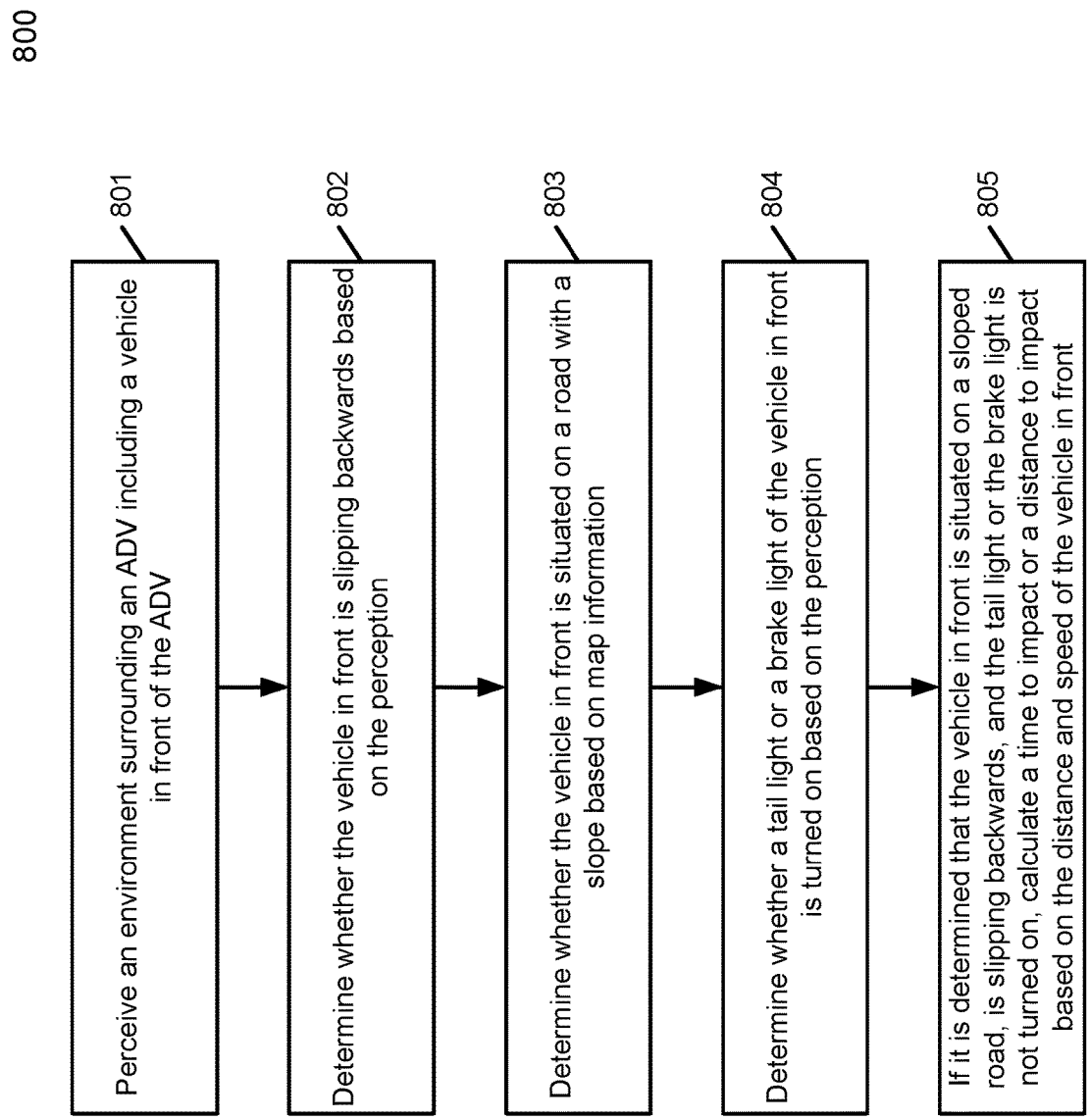
FIG. 8 illustrates an example flow diagram for a method according to one embodiment.

FIG. 8 illustrates an example flow diagram for a method according to one embodiment. Process 800 may be performed by processing logic which may include software, hardware, or a combination thereof. For example, process 800 may be performed by slip back module 308 of FIG. 3A. Referring to FIG. 8, at block 801, processing logic perceives an environment surrounding an ADV including a vehicle in front of the ADV. At block 802, processing logic determines whether the vehicle in front is slipping backwards based on the perception. At block 803, processing logic determines whether the vehicle in front is situated on a road with a slope based on map information. At block 804, processing logic determines whether a tail light or a brake light of the vehicle in front is turned on based on the perception. At block 805, if it is determined that the vehicle in front is situated on a sloped road, is slipping backwards, and the tail light or the brake light is not turned on, processing logic calculates a time to impact or a distance to impact based on the distance and speed of the vehicle in front.

In one embodiment, determining the vehicle in the front of the ADV is slipping backwards includes determining a speed of the vehicle in front of the ADV and a distance to the vehicle in front at two different time frames, and determining the distance to the vehicle in front is decreasing for the two different time frames. In one embodiment, if the time to impact is less than a first predetermined time threshold (e.g., 8 seconds) based on the calculations, triggering a warning system including sending a warning signal to warn passengers of the slip back.

In one embodiment, the warning signal includes a short horn sound signal, a continuous horn sound signal, or a flash of a headlamp of the ADV to warn passengers of the vehicle in front of the ADV. In another embodiment, the continuous horn sound signal is increasing in volume as a distance to impact decreases. In one embodiment, the warning signal includes a visual and/or audio cue, or a shake of a steering wheel of the ADV to warn passengers of the ADV. In one embodiment, processing logic further determines presence of an imminent impact, determines whether it is safe to release a brake of the ADV, and releases the brake of the ADV prior to the impact.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
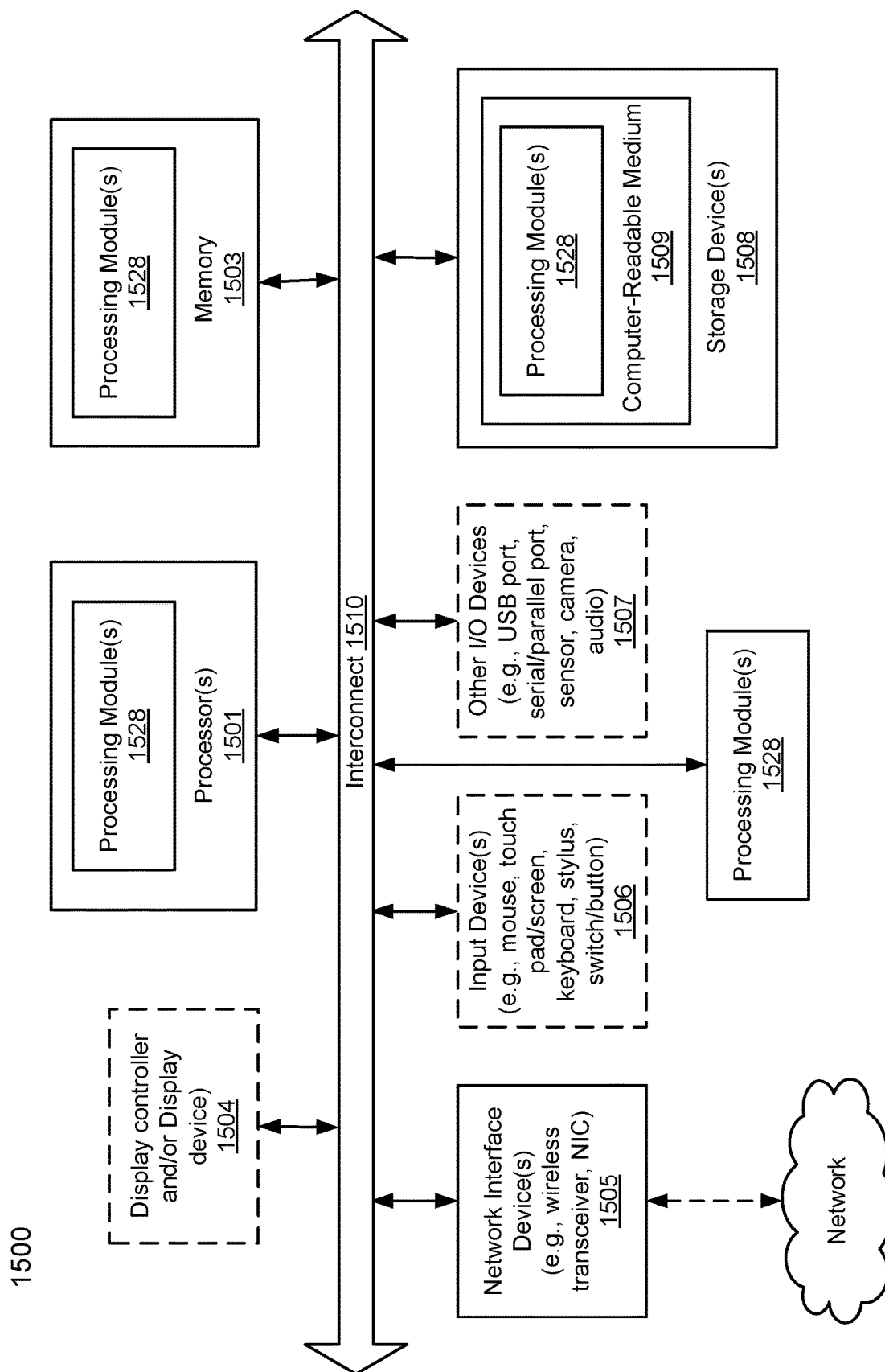
FIG. 9 is a block diagram illustrating a data processing system according to one embodiment.

FIG. 9 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include 10 devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, perception module 302, and slip back module 308. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
    perceiving a driving environment surrounding the ADV based on sensor data obtained from a plurality of sensors, including identifying a vehicle in front of the ADV;
    determining whether the vehicle in front is moving backwardly based on the perception;
    determining whether a tail light or a brake light of the vehicle in front is turned on based on the perception; and
    in response to determining that the vehicle is moving backwardly and the tail light or the brake light of the vehicle is not turned on, generating a warning signal to warn a driver of the vehicle in front of the ADV.

2. The method of claim 1, wherein determining whether the vehicle in the front of the ADV is moving backwardly comprises:
    determining a distance to the vehicle in front at two different points in time; and
    determining whether the distance to the vehicle in front is decreasing for the two different points in time.

3. The method of claim 1, further comprising determining whether the vehicle in front is situated on a road with a slope based on map information, wherein the warning signal is generated in response to determining that the vehicle is on a sloped road.

4. The method of claim 1, further comprising:
    calculating a time to impact based on a distance and speed of the vehicle in front; and
    determining whether the time to impact is less than a predetermined time threshold, wherein the warning signal is generated if the impact time is less than the predetermined time threshold.

5. The method of claim 1, wherein the warning signal includes a short horn sound signal, a continuous horn sound signal, or a flash of a headlamp of the ADV to warn passengers of the vehicle in front of the ADV.

6. The method of claim 5, wherein the continuous horn sound signal is increasing in volume as a distance to impact decreases.

7. The method of claim 1, wherein the warning signal includes a visual and/or audio cue, or a shake of a steering wheel of the ADV to warn passengers of the ADV.

8. The method of claim 1, further comprising:
determining whether it is safe to release a brake of the ADV; and
releasing the brake of the ADV prior to impact, if it is determined to be safe to release the brake of the ADV.

9. A non-transitory machine-readable medium having instructions stored therein, which when executed by a processor, cause the processor to perform operations, the operations comprising:
perceiving a driving environment surrounding an ADV based on sensor data obtained from a plurality of sensors, including identifying a vehicle in front of the ADV;
determining whether the vehicle in front is moving backwardly based on the perception;
determining whether a tail light or a brake light of the vehicle in front is turned on based on the perception; and
in response to determining that the vehicle is moving backwardly and the tail light or the brake light of the vehicle is not turned on, generating a warning signal to warn a driver of the vehicle in front of the ADV.

10. The machine-readable medium of claim 9, wherein determining whether the vehicle in the front of the ADV is moving backwardly comprises:
determining a distance to the vehicle in front at two different points in time; and
determining whether the distance to the vehicle in front is decreasing for the two different points in time.

11. The machine-readable medium of claim 9, wherein the operations further comprise determining whether the vehicle in front is situated on a road with a slope based on map information, wherein the warning signal is generated in response to determining that the vehicle is on a sloped road.

12. The machine-readable medium of claim 9, wherein the operations further comprise:
calculating a time to impact based on a distance and speed of the vehicle in front; and
determining whether the time to impact is less than a predetermined time threshold, wherein the warning signal is generated if the impact time is less than the predetermined time threshold.

13. The machine-readable medium of claim 9, wherein the warning signal includes a short horn sound signal, a continuous horn sound signal, or a flash of a headlamp of the ADV to warn passengers of the vehicle in front of the ADV.

14. The machine-readable medium of claim 13, wherein the continuous horn sound signal is increasing in volume as a distance to impact decreases.

15. The machine-readable medium of claim 9, wherein the warning signal includes a visual and/or audio cue, or a shake of a steering wheel of the ADV to warn passengers of the ADV.

16. The machine-readable medium of claim 9, wherein the operations further comprise:
determining whether it is safe to release a brake of the ADV; and
releasing the brake of the ADV prior to impact, if it is determined to be safe to release the brake of the ADV.

17. A data processing system, comprising:
a processor; and
a memory coupled to the processor to store instructions, which when executed by the processor, cause the processor to perform operations, the operations including
perceiving a driving environment surrounding an ADV based on sensor data obtained from a plurality of sensors, including identifying a vehicle in front of the ADV;
determining whether the vehicle in front is moving backwardly based on the perception;
determining whether a tail light or a brake light of the vehicle in front is turned on based on the perception; and
in response to determining that the vehicle is moving backwardly and the tail light or the brake light of the vehicle is not turned on, generating a warning signal to warn a driver of the vehicle in front of the ADV.

18. The system of claim 17, wherein determining whether the vehicle in the front of the ADV is moving backwardly comprises:
determining a distance to the vehicle in front at two different points in time; and
determining whether the distance to the vehicle in front is decreasing for the two different points in time.

19. The system of claim 17, wherein the operations further comprise determining whether the vehicle in front is situated on a road with a slope based on map information, wherein the warning signal is generated in response to determining that the vehicle is on a sloped road.

20. The system of claim 17, wherein the operations further comprise:
calculating a time to impact based on a distance and speed of the vehicle in front; and
determining whether the time to impact is less than a predetermined time threshold, wherein the warning signal is generated if the impact time is less than the predetermined time threshold.

* * * * *